(12) United States Patent
Walley

(10) Patent No.: US 11,778,375 B2
(45) Date of Patent: Oct. 3, 2023

(54) MOBILE COMMUNICATION DEVICES HAVING ADAPTABLE FEATURES AND METHODS FOR IMPLEMENTATION

(71) Applicant: Avago Technologies International Sales Pte. Limited, Singapore (SG)

(72) Inventor: John Walley, Ladera Ranch, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/839,321

(22) Filed: Jun. 13, 2022

(65) Prior Publication Data

US 2022/0312112 A1    Sep. 29, 2022

Related U.S. Application Data

(63) Continuation of application No. 16/006,163, filed on Jun. 12, 2018, now Pat. No. 11,363,375, which is a
(Continued)

(51) Int. Cl.
| | |
|---|---|
| *H04R 3/00* | (2006.01) |
| *H04M 1/60* | (2006.01) |
| *H04R 3/04* | (2006.01) |
| *H04B 17/00* | (2015.01) |
| *H04M 1/02* | (2006.01) |
| *H04R 29/00* | (2006.01) |
| *G01S 7/539* | (2006.01) |

(52) U.S. Cl.
CPC ............ *H04R 3/007* (2013.01); *H04B 17/00* (2013.01); *H04M 1/0202* (2013.01); *H04M 1/6066* (2013.01); *H04R 3/04* (2013.01); *H04R 29/00* (2013.01); *G01S 7/539* (2013.01); *H04R 2201/107* (2013.01); *H04R 2420/07* (2013.01); *H04R 2499/11* (2013.01)

(58) Field of Classification Search
CPC .......... H04R 3/007; H04R 3/04; H04R 29/00; H04R 2201/107; H04R 2420/07; H04R 2499/11; H04B 17/00; H04M 1/0202; H04M 1/6066; G01S 7/539
See application file for complete search history.

(56) References Cited

U.S. PATENT DOCUMENTS

| | | |
|---|---|---|
| 2,575,333 A | 11/1951 | Di Toro |
| 6,148,088 A | 11/2000 | Suzuki |
| (Continued) | | |

FOREIGN PATENT DOCUMENTS

| | | |
|---|---|---|
| GB | 2455826 | 6/2009 |

*Primary Examiner* — Md K Talukder
(74) *Attorney, Agent, or Firm* — Foley & Lardner LLP

(57) ABSTRACT

Provided are communication devices having adaptable features and methods for implementation. One device includes at least one adaptable component and a processor configured to detect an external cue relevant to operation of the at least one adaptable component, to determine a desired state for the at least one adaptable component corresponding to the external cue, and then to dynamically adapt the at least one adaptable component to substantially produce the desired state. One adaptable component comprises at least one adaptable speaker system. Another adaptable component comprises at least one adaptable antenna.

15 Claims, 3 Drawing Sheets

Related U.S. Application Data continuation of application No. 15/155,586, filed on May 16, 2016, now Pat. No. 10,038,956, which is a continuation of application No. 13/012,540, filed on Jan. 24, 2011, now abandoned.

(60) Provisional application No. 61/336,837, filed on Jan. 26, 2010.

(56) References Cited

U.S. PATENT DOCUMENTS

| | | | |
|---|---|---|---|
| 6,445,803 | B1 | 9/2002 | Boon |
| 7,218,175 | B1 | 5/2007 | Kobayashi |
| 7,353,041 | B2 | 4/2008 | Zhu |
| 8,037,511 | B1 | 10/2011 | Lundy |
| 8,228,038 | B2 | 7/2012 | Mullen |
| 8,254,984 | B2 | 8/2012 | Kerr |
| 8,259,953 | B2 * | 9/2012 | Jensen ............ H04R 9/022 381/397 |
| 8,299,866 | B2 | 10/2012 | Kim |
| 2004/0001601 | A1 | 1/2004 | Wang |
| 2004/0086140 | A1 | 5/2004 | Fedigan |
| 2005/0136848 | A1 * | 6/2005 | Murray ............ G10L 21/0208 455/78 |
| 2006/0158245 | A1 | 7/2006 | Ishikawa |
| 2006/0256977 | A1 | 11/2006 | Xiao |
| 2006/0262473 | A1 | 11/2006 | Neesgaard |
| 2007/0030983 | A1 | 2/2007 | Aarts |
| 2007/0036365 | A1 * | 2/2007 | Rohrseitz ............ H04R 25/70 381/60 |
| 2007/0121970 | A1 | 5/2007 | Miyazaki |
| 2007/0129020 | A1 | 6/2007 | Anton-Becker |
| 2007/0133818 | A1 * | 6/2007 | Griffin ............ H04B 15/02 381/94.1 |
| 2007/0147651 | A1 | 6/2007 | Mitobe |
| 2007/0180913 | A1 | 8/2007 | Higashihara |
| 2007/0189576 | A1 | 8/2007 | Chan |
| 2007/0263085 | A1 * | 11/2007 | Marton ............ H04N 7/147 348/E7.083 |
| 2008/0031467 | A1 | 2/2008 | Haulick |
| 2008/0199020 | A1 | 8/2008 | Suzuki |
| 2008/0285772 | A1 * | 11/2008 | Haulick ............ H04R 1/406 381/92 |
| 2009/0003630 | A1 | 1/2009 | Kuroda |
| 2009/0080675 | A1 | 3/2009 | Smirnov |
| 2009/0115288 | A1 | 5/2009 | Bianchini |
| 2009/0274323 | A1 | 11/2009 | Godart |
| 2010/0046772 | A1 * | 2/2010 | Veau ............ H04R 3/007 381/103 |
| 2010/0080084 | A1 * | 4/2010 | Chen ............ G01S 11/14 367/118 |
| 2010/0150367 | A1 * | 6/2010 | Mizuno ............ G10K 11/17833 381/71.6 |
| 2010/0232623 | A1 | 9/2010 | Martin |
| 2010/0272309 | A1 | 10/2010 | Buining |
| 2010/0304679 | A1 | 12/2010 | Zeng |
| 2010/0322432 | A1 | 12/2010 | Clemow ............ G10K 11/17885 381/71.1 |
| 2011/0093102 | A1 * | 4/2011 | Aichner ............ H04M 9/082 381/66 |
| 2011/0093262 | A1 | 4/2011 | Wittke |
| 2011/0124379 | A1 | 5/2011 | Chang |
| 2011/0148383 | A1 | 6/2011 | Mullen |
| 2011/0183629 | A1 | 7/2011 | Walley |
| 2013/0089223 | A1 | 4/2013 | Heineman |
| 2013/0249680 | A1 | 9/2013 | Goto |
| 2014/0341411 | A1 | 11/2014 | Mohindra |
| 2016/0261952 | A1 * | 9/2016 | Walley ............ H04M 1/6066 |
| 2020/0107164 | A1 * | 4/2020 | Lopatin ............ G01S 5/0284 |
| 2022/0312112 | A1 * | 9/2022 | Walley ............ H04M 1/6066 |

* cited by examiner

MOBILE COMMUNICATION DEVICES HAVING ADAPTABLE FEATURES AND METHODS FOR IMPLEMENTATION

RELATED APPLICATIONS

This application is a continuation of U.S. application Ser. No. 16/006,163, filed Jun. 12, 2018, which is a continuation of U.S. application Ser. No. 15/155,586, filed May 16, 2016, now U.S. Pat. No. 10,038,956, which is a continuation of U.S. application Ser. No. 13/012,540, filed Jan. 24, 2011, which claims the benefit of U.S. Provisional Application Ser. No. 61/336,837, filed on Jan. 26, 2010, the entire contents of each of which are hereby incorporated by reference herein.

BACKGROUND OF THE INVENTION

Field of the Invention

The present invention relates generally to electronic devices and systems. More particularly, the present invention relates to mobile communication devices and systems having adaptable features.

Background Art

As communication devices have matured in everyday use, the often countervailing pressures of feature inclusion and overall cost have led to a progression of devices that are increasingly complex, fragile, hard to exploit fully, and power hungry.

For example, a conventional mobile telephone includes the ability to network with other devices over typically three or more different communication links, where each interface associated with a particular communication link is separate and discrete, which takes up immense space, is costly to provide, and typically represents at least a phantom power draw that, summing over each discrete interface, substantially reduces battery life. Moreover, each additional interface increases a risk of interference between interfaces, which almost always increases design costs, and either limits utility or further worsens battery life due to additional required amplification and signal segregation circuitry. These general detriments are particularly troublesome because, typically, a communication device user is unable to exploit more than a few communication interfaces at any one time, yet the user is always subject to the reduced battery life and must pay extra for the privilege.

In addition to network interface complexity, many conventional mobile telephones incorporate a wide array of additional discrete sensor components used to detect ambient noise, for example, or to enable automated features. However, each additional discrete device is typically expensive to manufacture and mount in a mobile telephone enclosure, particularly as more features are packed into each communication device. Moreover, as each new sensor takes up additional surface area of a typical mobile telephone enclosure, the resulting user interface becomes less intuitive and harder to access while attempting to exploit the added functionality provided by, for example, new sensors.

In order to offset the increasing materials and design costs of adding each new market-driven functionality, manufacturers have typically turned to relatively inexpensive materials and implementations to form components for communication devices. Unfortunately, such materials and implementations are typically less robust than more expensive materials, and so the quality of particular component functionality is noticeably reduced, as is useful lifetime. For example, although speakers are integral to every electronic communication device, there is constant pressure to make speakers smaller and cheaper to manufacture to make room for the space and cost of, for example, additional sensors and additional network interfaces. This often results in communication device speakers that have substantially distorted outputs and that are extremely fragile in common usage, especially when driven near the substantially size and material-dependent limits of their operating range.

Accordingly, there is a need to overcome the drawbacks and deficiencies in the art by providing a communication device that reduces a number and cost of discrete components used to enable desirable features.

SUMMARY OF THE INVENTION

The present application is directed to mobile communication devices having adaptable features and methods for implementation, substantially as shown in and/or described m connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1A:
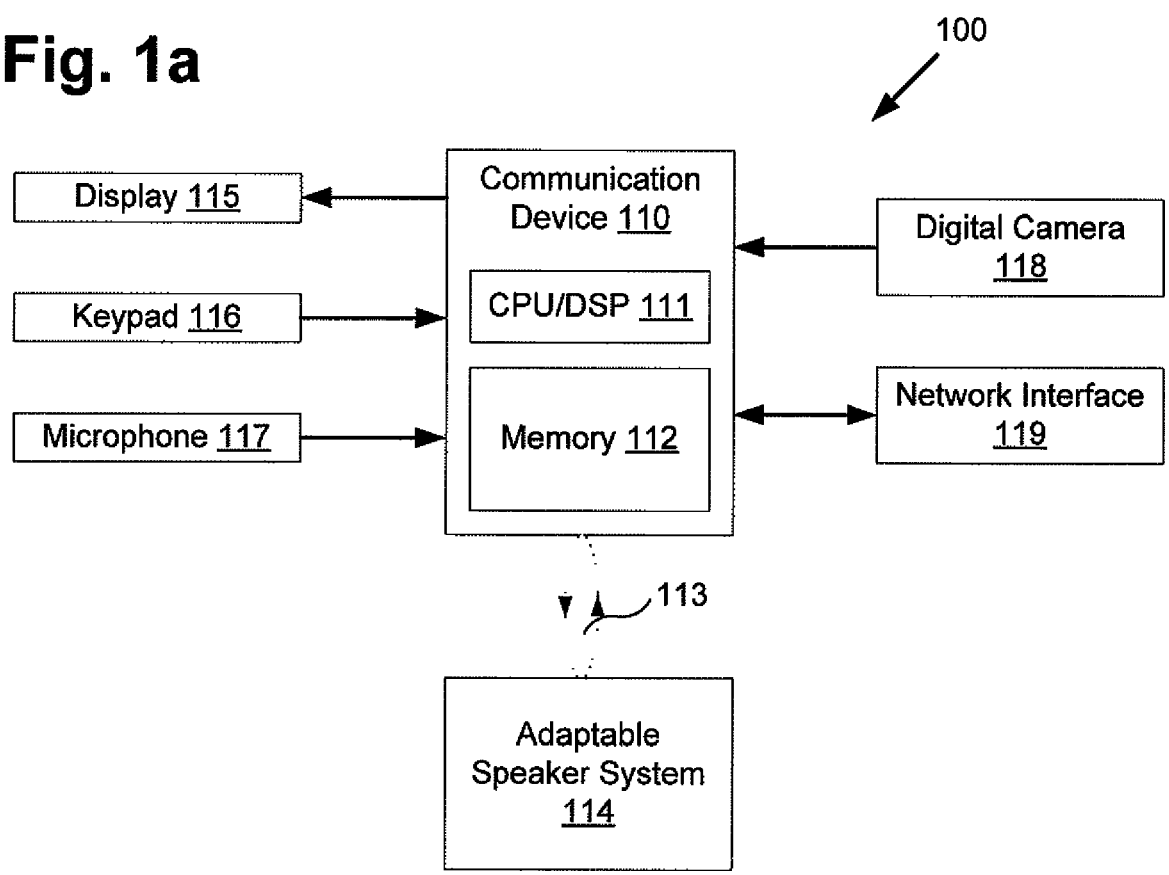
FIG. 1a presents a diagram of a communication device having adaptable features according to one embodiment of the present invention.

The present application is directed to mobile communication devices having adaptable features and methods for implementation. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1B:
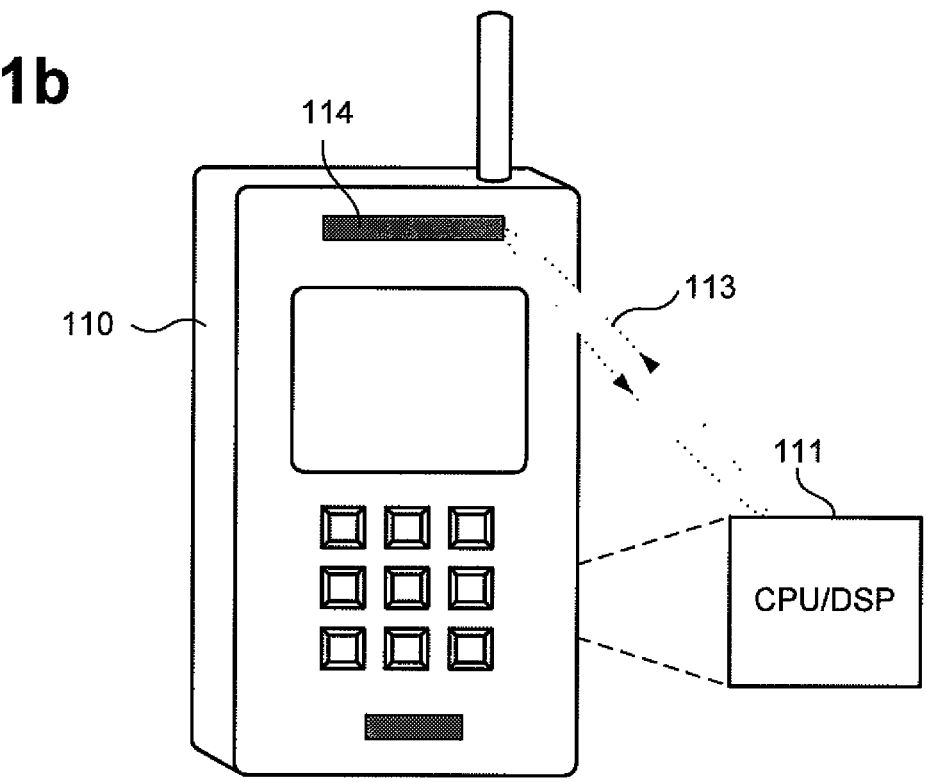
FIG. 1b presents an illustration of a communication device having adaptable features according to one embodiment of the present invention.

FIGS. 1a and 1b show a communication device including an adaptable speaker system, according to one embodiment of the present inventive concepts. According to the embodiment shown in FIGS. 1a and 1b, mobile telephone 110 includes adaptable speaker system 114 configured to dynamically adapt speaker output to improve speaker performance and prevent speaker damage due to a resonance event.

As is well known in the art, resonance in a speaker is highly undesirable. Even at its least damaging, resonance in a speaker produces substantial audio distortion. More ominously, however, speaker resonance can cause displacement of speaker components outside their targeted design range, and in some instances results in permanent damage to sensitive speaker elements. As a result, most existing speaker implementations include a conventional solution directed to avoiding or preventing a resonance event.

Conventional solutions to avoiding or preventing speaker resonance are essentially static solutions, i.e., solutions based upon predetermined or static anti-resonance algorithms implemented through the circuitry of the mobile device in which the speaker resides. However, because those predetermined anti-resonance algorithms are based on performance models derived from average device specifications and average speaker responses in a test lab environment, the static algorithms may work well for device speakers having performance profiles close to the average, but may be substantially less effective and even fail entirely to prevent destructive resonance events for other speakers or even the same speakers experiencing even slightly different environmental coupling than that present in a test lab.

For example, a typical speaker for a mobile telephone may be mounted in a mobile telephone enclosure using an automated assembly line that requires mounting clearances allowing for slight displacements due to acceptable assembly line alignment errors. However, even slight differences in mounting of a speaker in an enclosure, from phone to phone, may change the speaker's mechanical coupling to the enclosure enough to substantially change its performance or resonance profile relative to the average as modeled in a test lab. Moreover, environmental mechanical and acoustic coupling that goes beyond just a mobile telephone enclosure, for example, may similarly change a speaker's resonance profile. For instance, laying a mobile telephone on a hard metal table, for example, may shift its speaker's resonance profile substantially away from a modeled average based on hand use. Similarly, a relatively large change in temperature of a speaker, due to winter conditions for example, may also shift a resonance profile substantially away from a modeled average.

By configuring a mobile communication device, such as mobile telephone 110 in FIG. 1a, to adapt power levels for driving a speaker according to the dynamically measured performance of the speaker, rather than according to a static, predetermined algorithm, an adaptable speaker system can be implemented so as to optimize speaker performance while concurrently avoiding resonance and risk of damage. In effect, implementation of the present inventive principles results in a communication device speaker system being dynamically adaptable to its own response behavior.

Referring to FIG. 1a, communication device/mobile telephone 110 includes central processing unit/digital signal processor (CPU/DSP) 111, memory 112, adaptable speaker system 114, display 115, keypad 116, microphone 117, digital camera 118 and network interface 119. Mobile telephone 110 may comprise, for example, any communication device capable of providing electronic communication with, for example, one or more other communication devices over a network (not shown) accessed through use of network interface 119. Network interface 119 may additionally be configured to access other communication devices directly. Mobile telephone 110 may also comprise, for example, any communication device capable of accepting user input using keypad 116, microphone 117, and/or digital camera 118, for example, and outputting to display 115 and/or adaptable speaker system 114. Display 115 may, for example, comprise an integrated or external LCD display, or the like. Although mobile telephone 110 is depicted in FIG. 1a as including each of the above components, the inclusion or exclusion of any such components is not meant to limit the present inventive concepts. Also shown in FIGS. 1a and 1b is monitoring and control loop 113 enabling CPU/DSP 111 to dynamically adjust the input signal and/or power level for driving adaptable speaker system 114 according to one or more operating metrics of adaptable speaker system 114. For example, CPU/DSP 111 may be configured to adjust a power level for driving adaptable speaker system 114 by adjusting a drive voltage for adaptable speaker system 114. It is noted that although adaptable speaker system 114 is associated with mobile telephone 110 in the embodiment of FIG. 1a, in other embodiments, adaptable speaker system 114 can be implemented in any suitable communication device utilizing a speaker and configured to include a processor. For example, in addition to mobile telephone 110, adaptable speaker system 114 may be implemented in a personal digital assistant (PDA) or wireless headset, for example.

According to one example implementation corresponding to FIGS. 1a and 1b, CPU/DSP 111 of mobile telephone 110 can be configured to adjust the input signal or the power level for driving adaptable speaker system 114 according to a measured current draw by adaptable speaker system 114. A measured current draw of adaptable speaker system 114 may be used to determine a complex impedance of a speaker of adaptable speaker system 114, and the complex impedance may indicate an impending resonance event by becoming relatively low as adaptable speaker system nears a resonance event. Because a current drawn by adaptable speaker system 114 may therefore rise as adaptable speaker system 114 approaches resonance, reducing the input signals or power level for driving adaptable speaker system 114 when the rise rate or absolute value of its input current nears, reaches or exceeds a maximum allowable current draw enables adaptable speaker system 114 to avoid or mitigate a destructive or distortive resonance event.

For instance, a closed loop approach, such as that represented by monitoring and control loop 113, can be used to dynamically adjust the inputs to adaptable speaker system 114 in order to avoid audio distortion and prevent destructive resonance. Monitoring and control loop 113 may comprise, for example, the steps of detecting an external cue relevant to operation of an adaptable component (e.g., adaptable speaker system 114), determining a desired state for the adaptable component corresponding to the external cue, and dynamically adapting the adaptable component to produce the desired state, all of which can be configured to be performed by CPU/DSP 111.

For example, CPU/DSP 111 may detect an external cue relevant to the operation of adaptable speaker system 114 by measuring a current draw of adaptable speaker system 114 using, for example, an analog current meter connected to an analog-to-digital converter that may, for example, be incorporated into either adaptable speaker system 114 or CPU/DSP 111, or both. Such measurement may include measuring amplitudes of one or more frequency components of a current draw as well as relative phases of one or more frequency components of a current draw, for example, in order to sufficiently characterize a complex impedance of a speaker of adaptable speaker system 114 using, for example, knowledge about an input signal and/or power level for driving adaptable speaker system 114. CPU/DSP 111 may determine a desired state for adaptable speaker system 114, for example, by determining that that a present current draw is nearing a maximum allowable current draw and then determining a corresponding reduced power level for driving adaptable speaker system 114 that prevents damage due to, for example, a destructive resonance event. A maximum allowable current draw may comprise a pre-determined, frequency dependent power profile for adaptable speaker system 114, for example, that indicates destructive power limits for adaptable speaker system 114. Alternatively, or in addition, a maximum allowable current draw may be dynamically determined through analysis, by CPU/DSP 111 for example, of a measured current draw of adaptable speaker system 114 over a period of time, where CPU/DSP 111 may be configured to recognize characteristics of such a time-dependent current draw that indicate impending damage to adaptable speaker system 114. A corresponding reduced power level for driving adaptable speaker system 114 may similarly be frequency dependent and may, for example, be configured to protect adaptable speaker system 114 from damage without unnecessarily reducing a fidelity of adaptable speaker system 114. CPU/DSP 111 may then dynamically adapt adaptable speaker system 114 by applying a reduced input signal or power level for driving adaptable speaker system 114 that prevents damage and allows adaptable speaker system 114 to operate substantially normally.

Because the input signals and/or power level for driving adaptable speaker system 114 are permitted by the present approach to remain high when a current drawn by adaptable speaker system 114 indicates that adaptable speaker system 114 is safely away from a detected destructive resonance event, the overall performance of adaptable speaker system 114 can be optimized according to its individual response profile, which, as explained above, may be dependent on mounting and other environmental mechanical and acoustic coupling, and may also be dependent on, for example, manufacturing defects.

In addition, or alternatively, monitoring and control loop 113 may also be configured to detect distortion that is unrelated to a resonance event. For example, distortion due to, for example, physical damage to adaptable speaker system 114, or over-driving adaptable speaker system 114, may be detected through analysis, by CPU/DSP 111 for example, of a measured current draw of adaptable speaker system 114 over a period of time. For example, CPU/DSP 111 may be configured to recognize current swings that are large, but less than a maximum allowable current draw, which indicate audio distortions substantially unrelated to resonance events. As explained above, a complex impedance of a speaker of adaptable speaker system 114 may become relatively low as adaptable speaker system nears a resonance event, resulting in an increasing current draw that can be measured and used to avoid the resonance event. With respect to audio distortions substantially unrelated to resonance events, a complex impedance of a speaker of adaptable speaker system may become non-linear, unstable, or otherwise fluctuate over time in a manner substantially disproportional to a power level for driving adaptable speaker system 114, which may result in a measured current draw that is similarly unstable and potentially destructive, but less than a maximum allowable current draw. CPU/DSP 111 may be configured to recognize such instability, for example, even though its amplitude is less than a maximum current draw for adaptable speaker system 114. For example, as noted above, CPU/DSP 111 may measure amplitudes of frequency components of a current draw as well as relative phases of frequency components, and from such information, determine, for example, whether a speaker of adaptable speaker system 114 is experiencing distortion at one or more frequencies.

CPU/DSP 111 may then be configured to determine, for example, a particular frequency dependent digital audio filter to apply to a input signal for adaptable speaker system 114 that reduces a detected distortion without unnecessarily affecting other portions of the input signal and undesirably reducing a fidelity of adaptable speaker system 114. Moreover, in addition to retaining fidelity while reducing distortion, reduction of detected distortion may reduce a risk of damage to adaptable speaker system 114 and/or prolong its useful lifetime. Although relatively low current detected distortion may not immediately damage a speaker of adaptable speaker system 114, long periods of such distortion may substantially overwork a speaker of adaptable speaker system 114 and thus reduce its typically material-dependent useful lifetime.

In other embodiments, monitoring and control loop 113 may include additional steps comprising, for example, periodically providing a test signal to adaptable speaker system 114 configured to allow CPU/DSP 111 to determine or map present resonance frequencies of adaptable speaker system 114 in order to avoid subsequent damage during normal operation. Such a test signal may be audible or inaudible, and may be used to map resonant frequencies at higher frequencies than those typically audible by a human ear, such as those for ultrasonic signals.

By being able to dynamically adapt to changing resonances and other conditions that affect operation of a communication device component, such as adaptable speaker system 114, embodiments of the present invention provide a speaker system that can be driven louder than similarly priced conventional speaker systems, and that can last longer in normal operation by being less subject to risk of damage due to destructive resonance events or general distortion. Moreover, embodiments of the present invention may also provide greater overall fidelity without substantially increasing a cost of a speaker system by more finely tuning protective and distortion-corrective measures to the specific resonances and distortions present, rather than according to a relatively blunt and static pre-determined algorithm approach.

Figure 2:
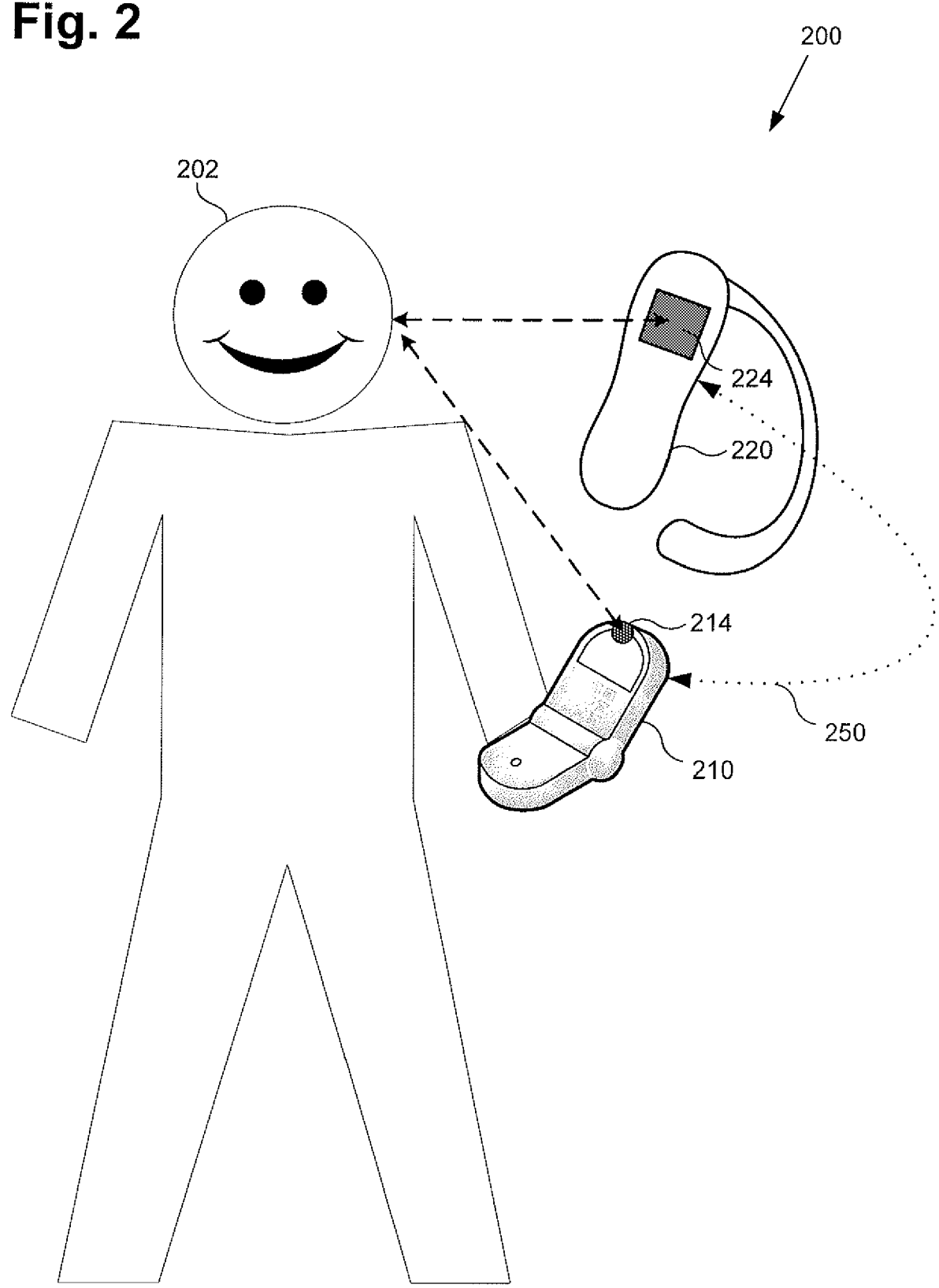
FIG. 2 presents an illustration of two communication devices having adaptable features in use, according to one embodiment of the present invention.

Moving to FIG. 2, FIG. 2 shows two mobile communication devices configured for interactive use, one or both of which may include an adaptable speaker system configured for proximity detection, according to one embodiment of the present inventive concepts. User environment 200, in FIG. 2, includes user 202 in possession of mobile telephone 210 and wireless headset 220.

According to the embodiment shown in FIG. 2, mobile telephone 210 is configured to operate interactively with wireless headset 220. For example, mobile telephone 210 and wireless headset 220 can be devices configured to access a common wired or wireless communication link 250, such as a USB, Bluetooth, Bluetooth LE, or WiFi mediated link, for example. In addition, and as further shown in FIG. 2, mobile telephone 210 includes adaptable speaker system 214 configured for proximity detection, and wireless headset 220 includes adaptable speaker system 224 also configured for proximity detection. Moreover, mobile telephone 210 and wireless headset 220 correspond to mobile telephone 110 in FIG. 1a, and adaptable speaker systems 224 and 222 correspond to adaptable speaker system 114 in FIG. 1a; e.g., each corresponding structure may be configured to exhibit the same features and/or operate substantially the same as its counterpart.

Although the embodiment shown in FIG. 2 represents wireless headset 220 including adaptable speaker system 224, in combination with mobile telephone 210 including adaptable speaker system 214, that representation is provided merely as an example. In one embodiment, for example, user environment 200 may include only a single communication device equipped with an adaptable speaker system, such as mobile telephone 210 including adaptable speaker system 214. Alternatively, in other embodiments, a user environment may include multiple interactive communication devices each including adaptable speaker systems.

Because a speaker can operate as a bi-directional transducer, an adaptable speaker system can be implemented for dual use as both a speaker and a microphone. In its capacity as a microphone, an adaptable speaker system can be configured to pickup or detect an echo (e.g., an external cue) produced by interaction of the speaker output with a nearby object, such as a human head, or an ear canal. Such an echo may indicate a proximity of a nearby object. Moreover, a communication device using such an adaptable speaker system may additionally be configured to distinguish between a human head, an ear canal, or for example, a hard table surface based on characteristics of a detected echo. Such an echo may comprise, for example, a reflected audio wave generating a corresponding reflected or delayed return signal evidenced as a transient in, for example, a power level used to drive an adaptable speaker system.

In one embodiment, the echo or speaker output feedback received by an adaptable speaker system could be used to modulate a measured current draw of the adaptable speaker system, for example, which in turn could be detected using, for example, control circuitry of a communication device in which the adaptable speaker system resides. For example, in one embodiment, a wireless headset equipped with an adaptable speaker system, e.g., wireless headset 220 equipped with adaptable speaker system 224, could be configured to measure a reflected or return signal resulting from an output test signal produced by adaptable speaker system 224. Such test signal may be audible or inaudible, for example, and may be ultrasonic. However, the return signal may also result from a typical output signal associated with normal use of, for example, mobile telephone 210. The return signal, detected through use of adaptable speaker system 224 and control circuitry (not shown in FIG. 2) of wireless headset 220, for example, could then be used to determine whether or not wireless headset 220 is being worn by user 202, e.g., whether adaptable speaker system 224 is situated in or adjacent to the ear canal of user 202.

It should be noted that in addition or as an alternative to using a speaker of adaptable speaker system as a microphone, one or more relatively high quality microphones may be integrated into adaptable speaker system 214 and/or adaptable speaker system 224, for example, in order to pick up or detect an external cue with substantially increased sensitivity, or to enhance operation of a speaker of the adaptable speaker systems as a microphone. For example, a speaker of adaptable speaker system 214 may be non-uniformly shaped in such a way as to provide some directionality information with respect to a proximity of a nearby object. In order to provide additional directionality information and, for example, reduce an error range for directionality of a nearby object, one or more relatively high quality microphones may be integrated into adaptable speaker system 214 to provide multiple return signals having multiple delays, for example, which may be used to substantially reduce an error range in determining directionality to a nearby object. Alternatively, or in addition, additional integrated microphones may be used to enable reception of signals typically outside the sensitivity of a speaker of, for example, adaptable speaker system 214. Although such integrated microphones may include additional drive circuitry separate from drive circuitry for a speaker of, for example, adaptable speaker system 214, integration with adaptable speaker system 214 provides enhanced proximity detection capability, relative to conventional microphone arrangements, and may do so without substantially increasing a number of discrete sensors included in, for example, mobile telephone 210.

In one embodiment, adaptable speaker system 224 could be used by wireless headset 220 to control an operating state of adaptable speaker system 224, wireless headset 220, or both. For example, feedback from a typical communication signal or, alternatively, an audible or inaudible test signal, issued by adaptable speaker system 224 could be used to automatically determine whether to turn wireless headset 220 on and/or maintain wireless headset 220 in an on state when wireless headset 220 is being worn by user 202, as well as to determine whether to automatically turn off wireless headset 220 when the proximity detection performed using adaptable speaker system 224 determines that wireless headset 220 is not being worn. Once such an operating state for adaptable speaker system 224 and/or wireless headset 220 is determined, the operating state may be applied to adaptable speaker system through use of, for example, control circuitry of wireless headset 220.

Analogously, adaptable speaker system 214 of mobile telephone 210 can be utilized by mobile telephone 210 to determine which of several optional communication modes to activate. Each such communication mode may comprise an operating state for adaptable speaker system 214. For example, detection of a human ear in near proximity to adaptable speaker system 214 could cause the audio output of mobile telephone 210 to be provided in handset mode, while the absence of such proximity, or, alternatively, detection of a table surface in near proximity to mobile telephone 210, could cause mobile telephone 210 to automatically activate a speaker-phone mode. In other embodiments, proximity detection may be used to choose one speaker or one display surface over another based on which surface is, for example, in contact with a table, cheek, or hand. In addition, by combining the distortion detection capability described previously, which allows a speaker of adaptable speaker system 214 to be driven louder than conventional speakers, with proximity detection, as described above, a speaker-phone mode may be automatically enabled, and one speaker of adaptable speaker system 214, for example, may be used for both typical use (e.g., cradled against a human ear) and a speaker-phone mode without risk of damage to adaptable speaker system 214.

As such, the presence of adaptable speaker systems 224 and 214 in respective communication devices 220 and 210 can enhance a transparency of interactivity between each of the devices and between the devices and their environment. For example, wearing of wireless headset 220 could be automatically detected by wireless headset 220 and cause all audio communications through paired mobile telephone 210 to be routed through wireless headset 220. Thus, user 202 need not be inconvenienced by having to turn wireless headset 220 on or off, rather, simply wearing wireless headset 220 is sufficient to activate it.

As another example, consider the circumstance in which user 202 is in a hands free situation in which it is illegal or unsafe to use mobile telephone 210 in handset mode, such as when driving a motor vehicle, for instance. Further assume that although user 202 is wearing wireless headset 220, wireless headset 220 powers off of its own accord, perhaps due to exhaustion of its battery power source. In the event of an incoming call under those circumstances, adaptable speaker system 214 and mobile telephone 210 could detect the absence of proximity to, for example, an ear of user 202, and the incoming call could automatically be answered in speaker-phone mode, freeing user 202 from the inconvenience or possible safety or legal risk associated with having to manually select speaker-phone mode in a hands free situation. Thus, an adaptable speaker system configured for proximity detection, according to the present inventive principles, can be implemented to advantageously enhance the user experience of operating a single communication device, as well as to enhance the transparent interactivity of two or more paired devices, enabling a user to more fully exploit their available features.

It should be noted that although proximity detection has been described with respect to embodiments including an adaptable speaker system, this is not mean to limit the scope of the present invention, and other embodiments may detect proximity using the same method described above but with conventional speaker systems and microphone arrangements only, or in addition to the use of an adaptable speaker system, as explained above. Such embodiments add little to no additional manufacturing cost over conventional communication devices, yet provide the additional functionality without a need for additional sensors or sensor capability.

However, by being able to detect proximity in addition to concurrently providing speaker output, embodiments of the present invention offer enhanced additional functionality without requiring the additional cost and space for relatively large additional mechanical components, such as a separate pressure sensor to detect proximity, for example. Moreover, as explained above, this additional functionality may also enable automatic application of operating states corresponding to proximity generally as well as to proximity to a distinguishable type of object, such as a human ear distinguishable from a table surface, for example.

In other embodiments in which the microphone sensitivity of adaptable speaker system 224, for example, is sufficiently high, adaptable speaker system 224 may be used to detect audible movements of a nearby object, such as vibrations in a human ear canal corresponding to speech by a user of wireless headset 220, for example. Acting concurrently as a microphone and a speaker, adaptable speaker system 224 and wireless headset 220 may detect such a local voice-generated signal (e.g., an external cue) and use such detection to determine a corresponding noise cancellation strategy for both adaptable speaker system 224 as well as for any other communication signals transmitted or received by wireless headset 220. Subsequently, wireless headset 220 may apply such a corresponding noise cancellation strategy.

For example, in one embodiment, control circuitry in wireless headset 220 (not shown) may be configured to receive a measured signal from adaptable speaker system 224 corresponding to both an output speaker signal and a microphone transient signal. The control circuitry may additionally be configured, for example, to subtract the known output speaker signal from the measured signal to isolate and detect the transient signal. As described above, this transient signal may indicate proximity by simply comprising a delayed reflection of the output speaker signal. Additionally, however, the transient signal may also comprise a local voice-generated signal received by adaptable speaker system 224. Under such circumstances, the control circuitry of wireless headset 220 may be configured to detect the presence of such a local voice-generated signal in the transient signal by, for example, isolating the local voice-generated signal from the transient signal. Isolation of a local-voice-generated signal may be performed, for example, through subtraction of a synthesized delayed reflection of the output speaker signal from the transient signal, through comparison of the transient signal with a microphone signal generated by, for example, a microphone of wireless headset 220 (not shown in FIG. 2), such as microphone 117 of mobile telephone 110 in FIG. 1, or through any combination of the above, in addition to other known signal detection methods. Upon affirmatively detecting a local voice-generated signal received by adaptable speakers system 110, the control circuitry may further be configured to apply a less aggressive noise cancellation strategy, for example, for the adaptable speaker system. Alternatively, if no local-voice generated signal is detected, a more aggressive noise cancellation strategy may be applied since the aggressive noise cancellation would not interfere with speech of user 202. Correspondingly, this selection of noise cancellation strategy may be applied to a communication signal transmitted to another communications device.

Although the above embodiment is described such that control circuitry (not shown in FIG. 2) of wireless headset 220 and adaptable speaker system 224 are utilized for signal detection, state determination, and dynamic adaptation, it should be understood that in alternative embodiments, where wireless headset 220 and mobile telephone communicate over communication link 250, for example, either or both adaptable speaker systems 214 and 224 may be used in conjunction with either or both control circuitries of mobile telephone 210 and wireless headset 220 to perform the tasks outlined above.

In addition, it should be understood that adaptable speaker systems 214 and 224 may additionally or alternatively use one or more integrated microphones to determine a microphone transient signal, as described above.

By being capable of detecting local voice-generated signals, in addition to concurrently providing speaker output as well as, in some embodiments, proximity detection, as described above, embodiments of the present invention may provide extensive additional features with little to no additional cost or space requirements over that required to provide the basic functionality of a speaker system. Moreover, embodiments of the present invention may reduce an overall discrete component number conventionally associated with such features while providing the additional functionality, which may serve to reduce general power consumption as well as overall manufacturing cost, thereby increasing the relative utility and marketability of representative communication devices. Furthermore, proximity detection performed as described above, using acoustic means, may provide proximity data for objects that are further away than what is detectable by conventional capacitive means, for example, and may provide less error-prone proximity detection than conventional means, particularly when used in conjunction with an ultrasonic test signal, as described above.

Figure 3:
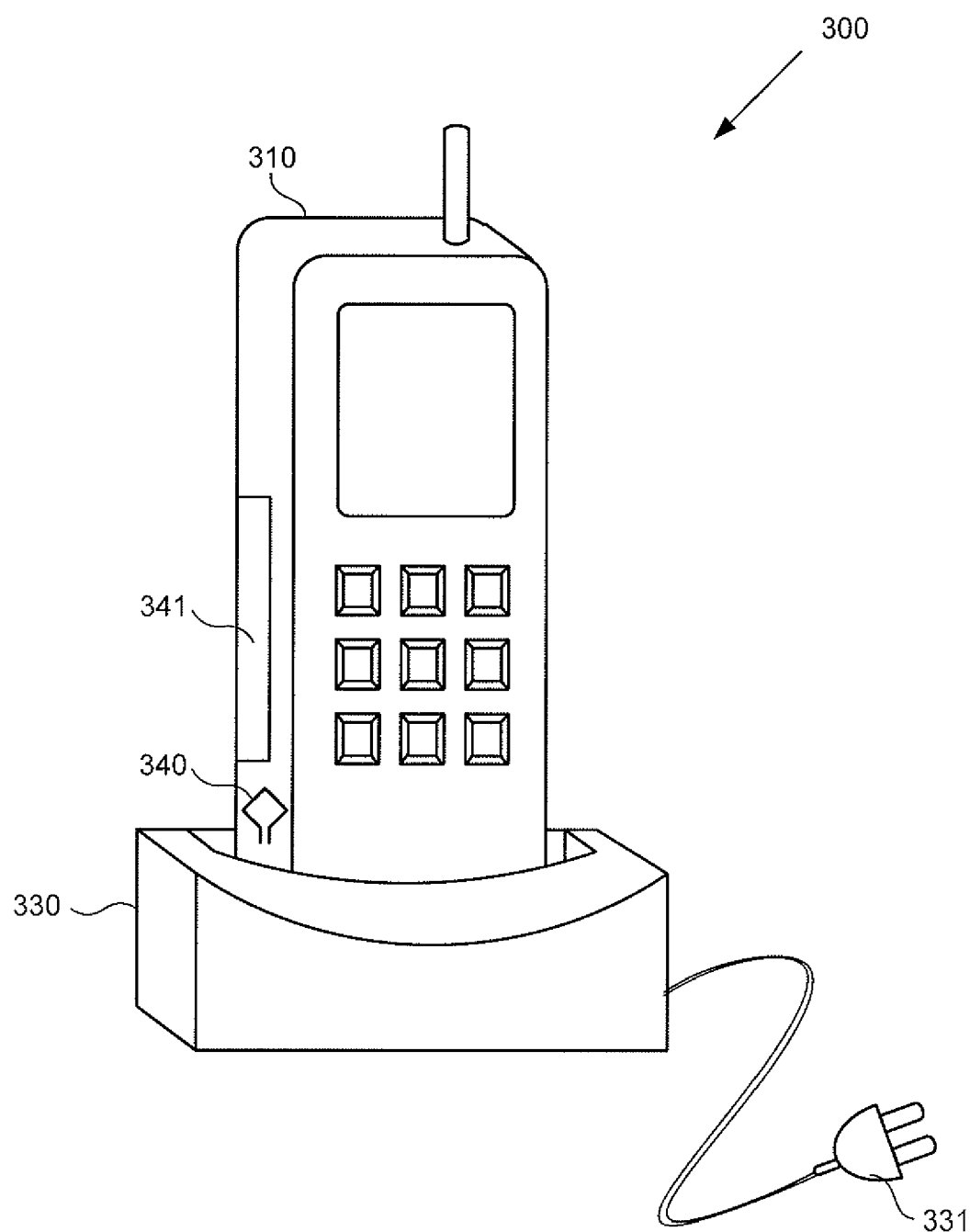
FIG. 3 presents an illustration of a communication device having adaptable features according to one embodiment of the present invention.

Moving now to FIG. 3, FIG. 3 shows a power charger and a mobile communication device including an adaptable antenna configured to receive power wirelessly from the power charger, according to one embodiment of the present inventive concepts. Charging environment 300 includes mobile telephone 310 including battery 341 and adaptable antenna 340. Mobile telephone 310 corresponds to mobile telephone 110 in FIG. 1a; e.g., each corresponding structure may be configured to exhibit the same features and/or operate substantially the same as its counterpart. Also shown in FIG. 3 is power charger 330 including electrical plug interface 331.

According to the embodiment shown in FIG. 3, power charger 330 is configured to connect to a mains AC power line through a standard wall mounted electrical socket, using electrical plug interface 331 for example, and to provide power to mobile telephone 310. In addition, power charger 330 may be configured to support a back channel communication between itself and mobile telephone 310. According to the embodiment of FIG. 3, power transfer is implemented wirelessly. Power may be transferred from power charger 330 to mobile telephone 310 through inductive coupling, or resonant inductive coupling, for example, using adaptable antenna 340 of mobile telephone 310. In one such embodiment, for example, mobile telephone 310 can be configured to utilize the inductive link used for power transfer as a wireless communication channel. Alternatively, mobile telephone 310 can be configured to access a communication unit resident on power charger 330 (communication unit not shown in FIG. 3) to establish a suitable wireless communication link independent of the inductive link used for power transfer, such as a Bluetooth, Bluetooth LE, or WiFi mediated link, for example.

Adaptable antenna 340 may comprise a multi-mode coil antenna, for example, configured to support one or more communication modes, in addition to mediating inductive power transfer from power charger 330. For example, adaptable antenna 340 may be a coil configured to support near field communication (NFC), radio-frequency identification (RFID), or frequency modulated (FM) communications, for example, or any combination of these individual modes. In addition to being operable in at least one communication mode, adaptable antenna 340 can be configured so as to be tunable for use in a power transmission mode. Tuning of adaptable antenna 340 may be accomplished by appropriate tapping-off of adaptable antenna 340, for example, as well as by including an additional tank circuit within the circuitry of adaptable antenna 340 or mobile telephone 310. In some embodiments, adaptable antenna 340, the additional tapping-off of adaptable antenna 340, and at least one additional tank circuit may be integrated into a single device.

For example, mobile telephone 310 may include control circuitry (not shown in FIG. 3) configured to receive an external cue or request for either a particular communication mode or a power transmission mode, for example, over a communication link or through user interaction. Such a request may comprise, for example, a communication request for a particular communication mode from, for example, a separate communication device, a request for power, a power-monitoring request, a request from power charger 330, a request from battery 341, or any combination of the above. Upon detecting such a request, the control circuitry may be further configured to determine a desired state for adaptable antenna 340 by determining that a present mode of adaptable antenna 340 is different from the requested mode and determining a new configuration for adaptable antenna that corresponds to the requested mode. For example, while in NFC mode, a user may request an FM mode, and an FM configuration for adaptable antenna 340 may be determined.

Subsequently, the control circuitry may be configured to adapt adaptable antenna 340 to produce the requested mode by applying the new configuration corresponding to the requested mode. Such new configuration may comprise, for example, tuning adaptable antenna 340 to the requested mode by, as explained above, appropriate tapping-off of adaptable antenna 340, for example, as well as by switching in an additional tank circuit within the circuitry of adaptable antenna 340 or mobile telephone 310.

Thus, according to the present inventive concepts, a single antenna included in mobile telephone 310, such as an NFC antenna incorporated into a backplate of mobile telephone 310, for example, can serve dual or multiple mode use as an adaptable antenna configured to support both communication and power transfer. For example, in one embodiment, adaptable antenna 340 could be implemented to be adaptable for supporting both NFC at a frequency of approximately 13.56 MHz, and for use as an inductive power transfer coil at frequencies in the range of approximately 1 MHz. As such, embodiments of the present invention advantageously provide a communication device system architecture less prone to interference, substantially smaller and less costly to implement relative to conventional devices without similarly adaptable components.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:
1. A speaker system, comprising:
a speaker; and
circuitry configured to:
    detect an echo of an output from the speaker reflected by an object outside the speaker system;
    determine, based on the echo, a proximity of the speaker system to the object comprising a human ear canal;
    control an operating state of the speaker system based on the determined proximity;
    detect audible movement of the object from vibrations in the human ear canal corresponding to speech by a user of the speaker system; and
    apply noise cancellation to the speaker system based at least on the detected audible movement.

2. The speaker system of claim 1, wherein the circuitry is further configured to provide a test signal to the speaker, and wherein the output of the speaker comprises the test signal.

3. The speaker system of claim 2, wherein the test signal output by the speaker is inaudible to a user of the speaker system.

4. The speaker system of claim 3, wherein the test signal is ultrasonic.

5. The speaker system of claim 1, wherein the echo is picked up by the speaker operating as a bi-directional transducer.

6. The speaker system of claim 1, further comprising:
a microphone,
wherein the echo is picked up by the microphone.

7. The speaker system of claim 6, wherein the circuitry is further configured to:
detect audible movement of the object picked up by the microphone.

8. The speaker system of claim 7,
wherein the circuitry is further configured to reduce the noise cancellation in response to detecting the speech by the user.

9. The speaker system of claim 7, wherein the circuitry is further configured to:
remove a speaker signal corresponding to the output of the speaker from a measured signal picked up by the microphone to isolate a transient signal; and
remove a synthesized delayed reflection of the speaker signal from the transient signal to isolate the audible movement of the object.

10. The speaker system of claim 1, wherein the circuitry is further configured to:
determine a type of the object based on properties of the detected echo; and
control the operating state of the speaker system based on the determined type of the object.

11. The speaker system of claim 1, wherein the operating state of the speaker system includes an on state, and wherein the circuitry is further configured to maintain the operating state of the speaker system in the on state when the speaker system is determined to be proximate to the object.

12. A speaker system, comprising:
a speaker; and
circuitry configured to:
detect an echo of an output from the speaker reflected by an object outside the speaker system;
determine, based on the echo, a proximity of the speaker system to the object comprising a human ear canal;
maintain an operating state of the speaker system in an on state when the speaker system is determined to be proximate to the object;
detect audible movement of the object from vibrations in the human ear canal corresponding to speech by a user of the speaker system; and
apply noise cancellation to the speaker system based at least on the detected audible movement.

13. The speaker system of claim 12, wherein the circuitry is further configured to: determine, based on the echo, a proximity of the speaker system to the object; and control an operating state of the speaker system based on the determined proximity.

14. The speaker system of 13, wherein the circuitry is further configured to provide a test signal to the speaker system, and wherein the output from the speaker system comprises the test signal.

15. The speaker system of claim 14, wherein the test signal output by the speaker system is inaudible to a user of the speaker system.

\* \* \* \* \*